(12) United States Patent
Willi et al.

(10) Patent No.: US 9,051,887 B2
(45) Date of Patent: Jun. 9, 2015

(54) SYSTEM AND METHOD FOR ADJUSTING FUEL REACTIVITY

(75) Inventors: Martin Willi, Dunlap, IL (US); George Donaldson, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 266 days.

(21) Appl. No.: 13/559,946

(22) Filed: Jul. 27, 2012

(65) Prior Publication Data

US 2014/0026847 A1    Jan. 30, 2014

(51) Int. Cl.
| | | |
|---|---|---|
| *F02B 43/00* | (2006.01) | |
| *F02B 47/00* | (2006.01) | |
| *F02D 41/00* | (2006.01) | |
| *F02D 19/08* | (2006.01) | |
| *F02B 17/00* | (2006.01) | |
| *F02B 23/06* | (2006.01) | |
| *F02D 19/06* | (2006.01) | |

(52) U.S. Cl.
CPC ........ *F02D 41/0025* (2013.01); *F02D 19/0694* (2013.01); *F02D 19/084* (2013.01); *F02D 19/085* (2013.01); *F02B 17/00* (2013.01); *F02B 17/005* (2013.01); *F02B 23/0663* (2013.01); *F02B 23/0696* (2013.01); *F02D 19/081* (2013.01); *Y02T 10/36* (2013.01); *Y02T 10/125* (2013.01)

(58) Field of Classification Search
CPC . F02D 41/0025; F02D 19/12; F02D 19/0694; F02D 19/084; F02D 19/085
USPC ......... 123/1 A, 27 GE, 3, 304, 435, 300, 299, 123/575
See application file for complete search history.

(56) References Cited

U.S. PATENT DOCUMENTS 5,887,566 A * 3/1999 Glauber et al. ............... 123/275
6,079,380 A * 6/2000 Jorgensen et al. ....... 123/73 AD (Continued)

FOREIGN PATENT DOCUMENTS

| EP | 0945606 A2 | 9/1999 |
| JP | 2009-191734 A | 8/2009 |
| WO | WO 2010/075167 A1 | 1/2010 |

OTHER PUBLICATIONS

Lienert, Anita, "Chrysler, Feds Developing Experimental Gasoline-Diesel Engine," *Edmunds Inside Line*, Jun. 7, 2011, downloaded from http://www.insideline.com/chrysler/chrysler-feds-developing-experimental-gasoline-diesel-engine.html on Jun. 21, 2012, 4 pp.

(Continued)

*Primary Examiner* — Lindsay Low
*Assistant Examiner* — George Jin
(74) *Attorney, Agent, or Firm* — Leydig, Voit & Mayer, Ltd.

(57) ABSTRACT

A method of operating an internal combustion engine uses fuels having different reactivities obtained from the same fuel source. A first fuel having a first reactivity is stored in a fuel reservoir. A portion of the first fuel is converted to a second fuel having a second reactivity. The first fuel is introduced into a combustion chamber having a piston moving in a cylinder at a first time when the piston is relatively closer to a bottom dead center (BDC) position and the second fuel is introduced into the combustion chamber at a second time when the piston is relatively further from the BDC position. In an aspect, the convertor may be adjustable to alter the reactivity of the second fuel. In an aspect, the convertor may use a processing fluid associated with the engine to convert the first fuel to the second fuel.

19 Claims, 4 Drawing Sheets

(56) References Cited

U.S. PATENT DOCUMENTS

| | | | |
|---|---|---|---|
| 6,619,274 B2 | 9/2003 | Miyashita et al. | |
| 6,622,663 B2 | 9/2003 | Weissman et al. | |
| 6,622,664 B2 * | 9/2003 | Holder et al. | 123/3 |
| 6,655,130 B1 | 12/2003 | Kirwan et al. | |
| 6,729,301 B2 | 5/2004 | Nakamori et al. | |
| 6,845,608 B2 * | 1/2005 | Klenk et al. | 60/274 |
| 6,866,016 B2 * | 3/2005 | Cueman | 123/299 |
| 6,959,693 B2 | 11/2005 | Oda | |
| 7,007,669 B1 | 3/2006 | Willi et al. | |
| 7,195,006 B2 | 3/2007 | Khair et al. | |
| 7,213,573 B2 | 5/2007 | Daniels et al. | |
| 7,231,906 B1 | 6/2007 | Haskara et al. | |
| 7,252,054 B2 | 8/2007 | Weber et al. | |
| 7,263,968 B2 | 9/2007 | Cairns et al. | |
| 7,293,409 B2 * | 11/2007 | Sellnau et al. | 60/286 |
| 7,597,072 B2 | 10/2009 | Stein et al. | |
| 7,690,336 B2 | 4/2010 | Bowman et al. | |
| 8,042,516 B2 | 10/2011 | Takahashi et al. | |
| 2005/0252489 A1 | 11/2005 | Moody | |
| 2006/0180099 A1 * | 8/2006 | Aimoto et al. | 123/1 A |
| 2007/0289573 A1 * | 12/2007 | Leone et al. | 123/305 |
| 2008/0000445 A1 * | 1/2008 | Kim et al. | 123/295 |
| 2008/0110419 A1 * | 5/2008 | Sakurai et al. | 123/3 |
| 2008/0230041 A1 | 9/2008 | Brusslar et al. | |
| 2008/0236546 A1 * | 10/2008 | Kakuho et al. | 123/406.3 |
| 2008/0257304 A1 * | 10/2008 | Noda et al. | 123/305 |
| 2009/0043479 A1 * | 2/2009 | Noda et al. | 701/103 |
| 2009/0178654 A1 * | 7/2009 | Leone et al. | 123/528 |
| 2009/0229541 A1 * | 9/2009 | Shimasaki et al. | 123/3 |
| 2010/0198481 A1 | 8/2010 | Bromberg et al. | |
| 2010/0268442 A1 * | 10/2010 | Kabashima et al. | 701/103 |
| 2011/0132284 A1 * | 6/2011 | Leone et al. | 123/3 |
| 2011/0132286 A1 * | 6/2011 | Leone et al. | 123/3 |
| 2011/0132287 A1 * | 6/2011 | Leone et al. | 123/3 |
| 2011/0132290 A1 * | 6/2011 | Leone et al. | 123/3 |
| 2011/0184629 A1 | 7/2011 | Krengel et al. | |
| 2011/0192367 A1 * | 8/2011 | Reitz et al. | 123/1 A |

OTHER PUBLICATIONS

Splitter, Derek et al., "Deer 2011—Heavy Duty RCCI," Univ. of Wisconsin, Engine Research Center, Oct. 5, 2011, 13 pp.

* cited by examiner

SYSTEM AND METHOD FOR ADJUSTING FUEL REACTIVITY

TECHNICAL FIELD

This patent disclosure relates generally to internal combustion engines and, more particularly to internal combustion engines that operate using fuels having different reactivities.

BACKGROUND

Internal combustion engines operating with more than one fuel are known. Certain engines use two or more fuels having different reactivities. One example of such an engine is described in U.S. Patent Application Pub. No. 2011/0192367, which was published on Aug. 11, 2011 to Reitz et al. (hereafter, "Reitz"), herein incorporated by reference in its entirety. Reitz describes a compression ignition engine that uses two or more fuel charges having two or more reactivities to control the timing and duration of combustion. According to Reitz, the two fuels are introduced into the combustion chamber at different times to produce stratified regions having different reactivities that will auto-ignite under compression. Controlling the timing of the injections can determine the location of the stratified regions at the time of combustion and can provide for more thorough and complete combustion of the two fuels. Fuel efficiency can therefore be improved and, as an ancillary benefit, emission byproducts of the combustion cycle can be reduced.

One drawback of the two-fuel system described in Reitz is that two fuel reservoirs or sources must be included with the internal combustion system. Operators of the two-fuel internal combustion system, whether it be utilized on a vehicle such as a truck or locomotive or as a stationary application such as an engine for a compressor, must periodically replenish two fuel reservoirs rather than one as is commonly done with more typical internal combustion engines. Moreover, supplies of two fuels with different reactivities may not be readily available or may be cost prohibitive. Such concerns have impeded the application of the two-fuel internal combustion system and the benefits of such systems have thus far not been widely realized.

SUMMARY

The disclosure describes, in one aspect, a method of operating an internal combustion engine which utilizes fuel having two different reactivities from a single fuel source. The method includes storing a first fuel in a first fuel reservoir where the first fuel has a first reactivity. The method further includes converting a portion of the first fuel to a second fuel having a second reactivity. The first fuel is introduced into a variable volume defined by a piston moving in a cylinder at a first time when the piston is relatively closer to a bottom dead center (BDC) position. The second fuel is then introduced into the variable volume at a second time when the piston is relatively further from the BDC position. The method can further adjust the conversion of the first fuel to the second fuel based upon one or more operating parameters of the internal combustion system.

The disclosure further provides, in another aspect, an internal combustion system including an internal combustion engine. The system also includes a first fuel reservoir storing a fuel of a first reactivity and a first fuel line directing a portion of the first fuel from the fuel reservoir to the internal combustion engine. The system further includes a second fuel line directing a portion of the first fuel to an adjustable convertor that converts the first fuel to a second fuel having a different reactivity. The second fuel line also directs the second fuel to the internal combustion engine.

In another aspect, the disclosure provides another method of operating an internal combustion engine. The method includes storing a first fuel in a first fuel reservoir where the first fuel has a first reactivity. The method combines a portion of the first fuel from the first fuel reservoir with a processing fluid used by the internal combustion engine to produce a second fuel having a second reactivity. The first fuel is introduced into a variable volume defined by a piston moving in cylinder at a first time when the piston is relatively closer to a bottom dead center (BDC) position. Next, the second fuel is introduced into the variable volume at a second time when the piston is relatively further from the BDC position to produce stratified regions of different reactivities in the variable volume.

DETAILED DESCRIPTION

Figure 1:
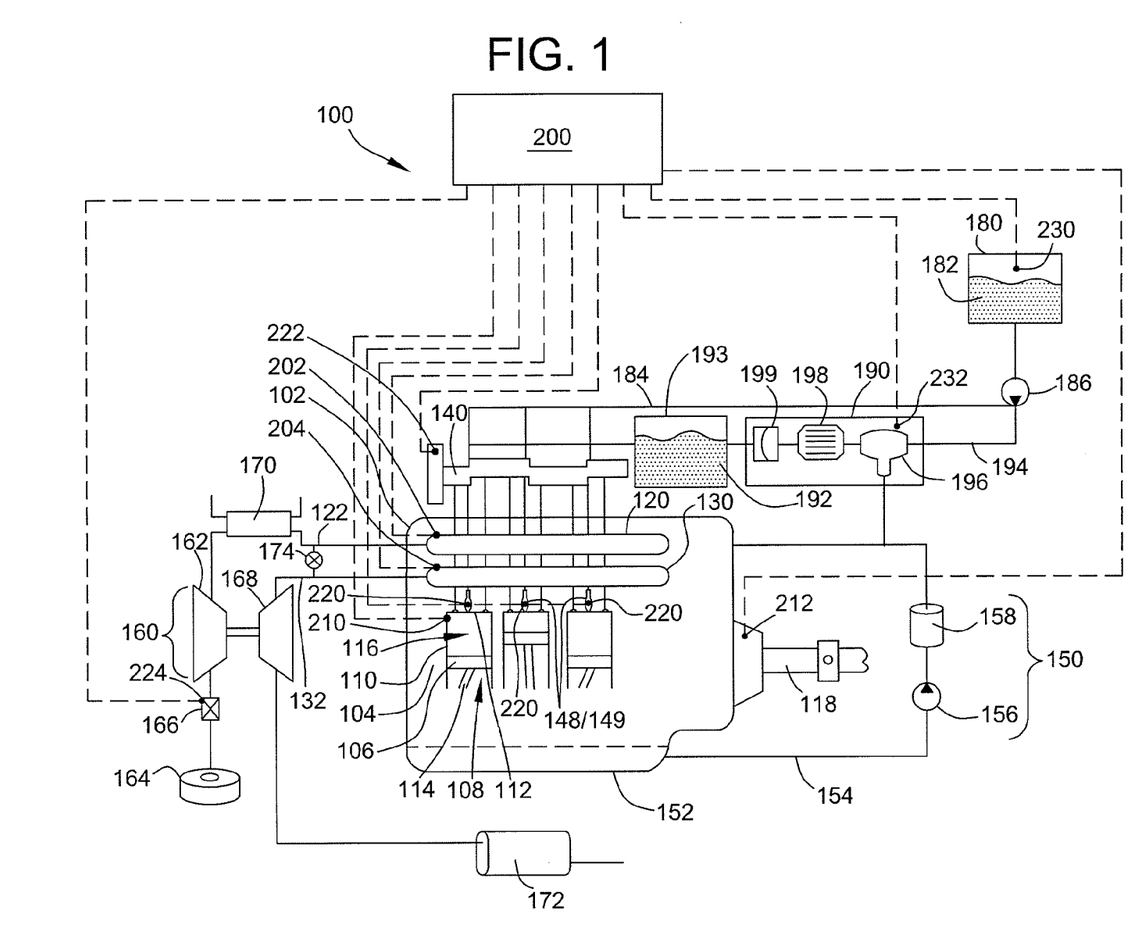
FIG. 1 is a block diagram representing an internal combustion system having an internal combustion engine adapted to burn fuels having different reactivities.

Now referring to the drawings, wherein like reference numbers refer to like elements, there is illustrated in FIG. 1 a representative internal combustion system 100 configured to operate with fuels of different reactivity. The internal combustion system 100 includes an internal combustion engine 102. Internal combustion engines burn fuel such as diesel to convert the potential or chemical energy therein to mechanical energy in the form of rotational motion. As will be familiar to those of skill in the art, diesel engines differ from spark-ignited engines by the method of ignition of the fuel. In a diesel engine, the fuel is mixed with air and compressed in a combustion chamber, raising the pressure and temperature of the mixture until it spontaneously ignites. This is in contrast to spark-ignition engines in which ignition is activated by a spark plug. Diesel engines therefore typically lack spark plugs. Although the internal combustion engine 102 does not have a spark plug, it will be appreciated that in other embodiments the engine could include a spark plug and could burn fuels different from diesel.

The internal combustion engine 102 includes an engine block 104 having at least one piston 106 reciprocally movable within a combustion chamber 108 delineated by an elongated, hollow bore or cylinder 110. Although FIG. 1 depicts the illustrated combustion engine 102 with three cylinders, it will be appreciated that fewer or more cylinders can be provided. Additionally, the cylinders can be arranged in-line, in dual parallel lines, or in a V formation. One end of the cylinder 110 is closed off by a flame deck surface 112 so that the combustion chamber 108 is generally enclosed between the piston 106, the flame deck surface 112 and the internal wall of the cylinder 110. The reciprocal piston 106 moves between a top dead center (TDC) position where the piston is closest to the flame deck surface 112 and a bottom dead center (BDC) position where the piston is furthest from the flame deck surface. These motions accomplish the intake and compression stroke described herein. The combustion chamber 108 thereby defines a variable volume 116 that expands and contracts as the piston 106 reciprocates within the cylinder 110 between the TDC position where the variable volume is at its smallest and the BDC position where the variable volume is at its largest. The compression ratio of a typical diesel-burning internal combustion engine may be on the order of 15:1, although other compression ratios are common.

To forceably drive the piston 106 within the cylinder 110, an oxidizer such as air and a combustible fuel are admitted into the cylinder and ignited in the combustion chamber 108. The burning of the fuel/air mixture, or combustion, creates a sudden expansion of the trapped gasses that forces the piston 106 from the TDC position to the BDC position. The piston 106 is connected via a connecting rod 114 to a crankshaft that may be connected to or form part of a rotatable drive shaft 118. As the piston 106 reciprocally moves up and down within the cylinder 110, its linear motion is converted by the crankshaft to rotational motion that rotates the drive shaft 118. The drive shaft 118 can be connected to other devices or systems which utilize the rotational motion generated by the internal combustion engine 102.

Figure 2:
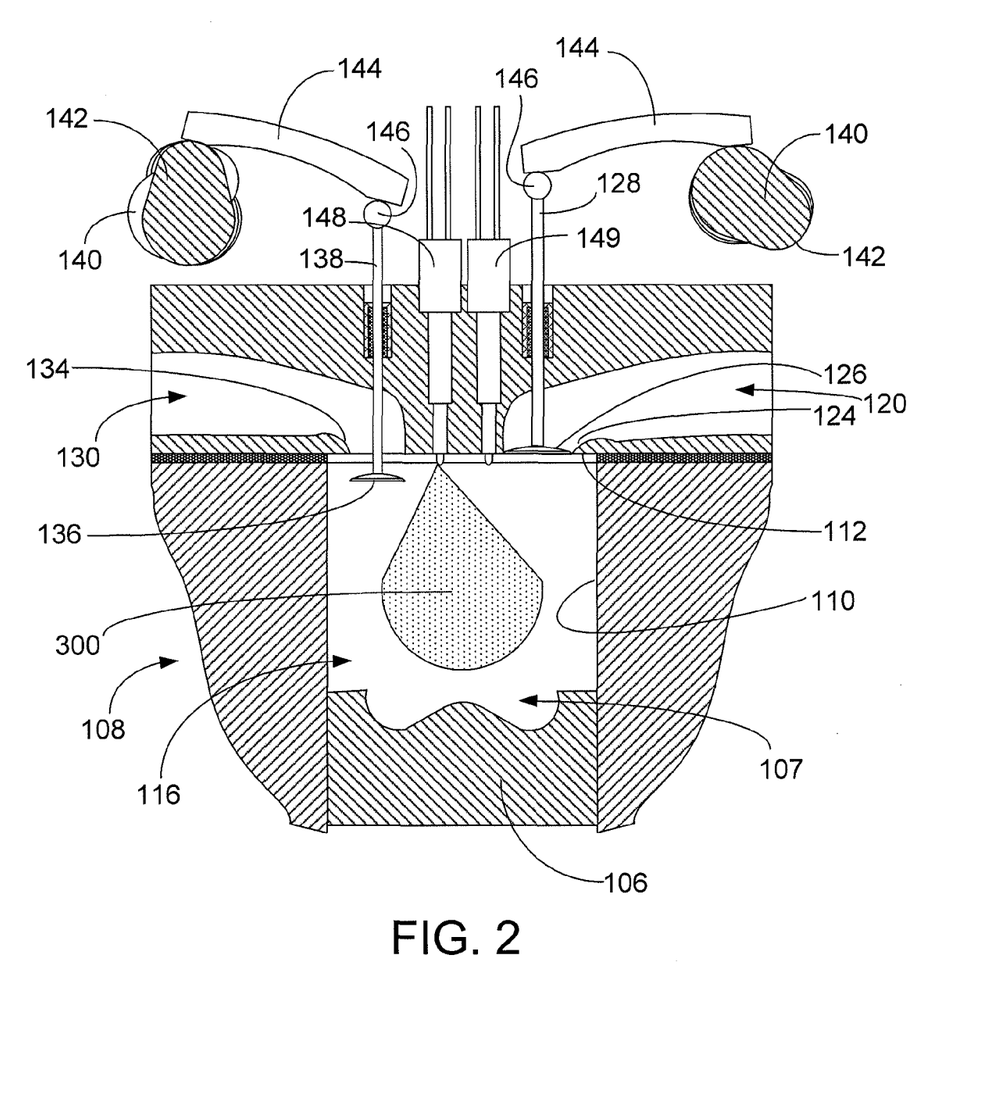
FIG. 2 is a cross-sectional view of an engine cylinder with a movable piston therein that may be disposed in the internal combustion engine and which shows the valves, camshafts, and fuel injectors operating in conjunction with the internal combustion engine.

Referring to FIGS. 1 and 2, to direct the air used in the combustion process to the cylinders 110, a hollow runner or intake manifold 120 can be formed in or attached to the engine block 104 and which may extend over and across each of the cylinders. The intake manifold 120 can communicate with an intake line 122 that directs air to the internal combustion engine 102. An intake port 124 can be disposed in the flame deck surface 112 that can be selectively opened and closed by an intake valve 126 to establish fluid communication between the intake manifold 120 and the cylinder 110. To direct the exhaust gasses produced by combustion of the air/fuel mixture out of the cylinder 110, a hollow exhaust manifold 130 communicating with an exhaust line 132 can also be disposed in the engine block 104 and can selectively communicate with the cylinder by an exhaust port 134 that is opened and closed by an exhaust valve 136. The intake valve 126 and the exhaust valve 136 can be displaced or moved up and down in an alternating manner to selectively open and close the intake port 124 and exhaust port 134 at alternating times.

To cause the intake valve 126 and exhaust valve 136 to open and close, the intake valve is connected to an intake valve pushrod 128 and the exhaust valve is connected to an exhaust valve pushrod 138 which extend vertically from the engine block 104 and which engage an overhead camshaft 140. The camshaft 140 includes a plurality of eccentric lobes 142 along its length with each lobe out-of-phase with respect to an adjacent lobe. A valve bridge 144 extends between the camshaft 140 and a cam follower 146 disposed on the distal end of each of the intake valve pushrods 128 and the exhaust valve pushrods 138. As the camshaft 140 rotates, the eccentric lobes 142 cause the valve bridge 144 to pivot which causes the intake valve 126 and exhaust valve 136 to alternately move up and down with respect to the intake port 124 and exhaust port 134. Motion of the piston 106 from the TDC position to the BDC position in the cylinder 110 can draw air through the intake port 124 when it is opened and motion of the piston from the BDC position to the TDC position can expel the exhaust gasses through the exhaust port 134. A single camshaft 140 may activate both the intake valve 126 and the exhaust valve 136 or two dedicated camshafts arranged parallel to each other may be separately associated with the intake valves and exhaust valves respectively. The arrangement of the eccentric lobes 142 along the camshaft 140 and the speed of rotation of the camshaft determines the timing of the valve openings and closings, the process of which may be referred to as variable valve timing.

To introduce fuel to the combustion chamber 108 at the appropriate time, a first electrically actuated fuel injector 148 and a second electrically actuated fuel injector 149 are associated with each cylinder 110 and disposed through the flame deck surface 112. In the illustrated embodiment, the first and second fuel injectors 148, 149 can be dedicated to separately introducing fuels of different reactivities. However, in other embodiments, a single, common fuel injector can be utilized to introduce fuels of different reactivities. Also, in other embodiments, introduction methods other than a fuel injector, such as a carburetor or the like, can be utilized. To assist mixing of the introduced fuel and intake air and to route the flow of gasses in the cylinder 110 during the combustion process, the top surface of the piston 106 can have a bowl 107 disposed into it.

Referring back to FIG. 1, to lubricate the moving components of the engine block 104, the internal combustion engine can include a lubrication system 150 that directs a lubricant such as oil to the moving components. The lubrication system 150 can include an oil pan or an oil reservoir 152 that is generally located toward the bottom of the engine block 104 and that may be associated with the crankcase in which the crankshaft and/or driveshaft are disposed. Oil can drain towards to the oil reservoir 152 under the influence of gravity. One or more oil lines 154 can be disposed about the internal combustion system 100 to direct the oil from the oil reservoir to various locations about the internal combustion engine 102. To forcibly direct the oil through the lubrication system 150, an oil pump 156 such as a gear pump can be disposed along the oil line 154. To remove particulate matter or contamination that may become entrained in the oil, the lubrication system 150 can also include an oil filter 158 disposed along the oil line 154.

Referring to FIG. 1, the internal combustion system 100 can include other devices that assist the internal combustion process. For example, the internal combustion system 100 can include a turbocharger 160 that increases the amount or quantity of air introduced to the internal combustion engine 102. The turbocharger 160 includes a compressor 162 that draws intake air from the atmosphere through an air filter 164. The amount of air drawn into the internal combustion system 100 can be adjustably controlled by an intake throttle 166 disposed between the air filter 164 and the compressor 162. The compressor 162 compresses the drawn air and directs the pressurized air onto the intake manifold 120. To cool the pressurized intake air which may become heated by compressor 162 during compression, the air may be directed through an optional intercooler 170 disposed between the compressor and the intake manifold 120. To power the compressor 162, a turbine 168 communicates with the exhaust gas manifold 130 and can receive pressurized exhaust gasses expelled from the combustion chambers 108 by the pistons 106. The pressurized exhaust gasses directed through the turbine 168 can rotate a series of blades therein that are rotatably coupled to corresponding blades in the compressor 162. The exhaust gasses may then be directed through one or more exhaust after-treatment devices 172 disposed along the exhaust line 132 such as catalytic converters, diesel particulate filters, or mufflers.

To reduce the emissions that are produced by the combustion process, the internal combustion system 100 can include an exhaust gas recirculation ("EGR") system that combines a portion of the exhaust gasses with the intake air being directed to the combustion chambers. EGR displaces the amount of oxygen in the intake air and generally lowers the flame temperature of combustion within the cylinders. The EGR system can be realized by an EGR valve 174 disposed between and establishing communication between the intake line 122 and the exhaust line 132. The EGR valve 174 can be adjusted to control the amount of exhaust gasses recirculated back to the intake manifold 120. In the embodiment illustrated in FIG. 1, the EGR valve 174 is disposed upstream of the turbocharger 160 and receives high-pressure exhaust gasses. The illustrated system is therefore referred to as high-pressure EGR system. Alternatively, the EGR valve 174 can be disposed downstream of the turbocharger 160 and receive low-pressure exhaust gasses. Such a system may be referred to as a low-pressure EGR system.

To provide the fuel for the combustion process, the internal combustion system 100 includes a first fuel reservoir 180 which can accommodate and store a first fuel 182. Although the internal combustion system 100 is generally described as using a hydrocarbon fuel and particularly diesel, it will be appreciated that other types of fuel may be used such as gasoline, ethanol, propane, and biofuels. The fuel stored in the first fuel reservoir 180 will have an associated reactivity. Reactivity generally refers to the readiness of the fuel to combust upon compression ignition with higher reactivity fuels typically igniting more quickly than lower reactivity fuels. Reactivity can be related to the cetane number of the fuel that is a measure of the speed at which a fuel starts to auto-ignite under compression. Diesel fuels commonly available may have a cetane number from about 40 to about 55. To direct the fluid fuel to the internal combustion engine 102, a first fuel line 184 in fluid communication with the fuel injectors 148/149 in the internal combustion engine can extend to the first fuel reservoir 180. To pressurize the fuel and force it to flow through the first fuel line 184, a fuel pump 186 can be disposed in the fuel line.

To provide a second fuel of a different reactivity for producing stratified regions within the combustion chamber, the internal combustion system 100 includes a convertor 190 that converts the first fuel 182 by adjusting the reactivity of the first fuel. To store the second fuel 192, the convertor 190 can be associated with a second fuel reservoir 193 that receives the output of the convertor. To direct the first fuel 182 to the convertor 190, the internal combustion system includes a second fuel line 194 in fluid communication with the first fuel reservoir 180 and that terminates at the fuel injectors 148/149. The convertor 190 can be disposed along the second fuel line 194 between the first fuel reservoir 180 and the internal combustion engine 102. Thus, the fuel introduced to the combustion chambers 108 can be selected from the first fuel reservoir 180 with the first fuel 182 of a first reactivity or from the convertor 190 that produces the second fuel 192 of a second reactivity.

In accordance with one embodiment of the disclosure, the convertor 190 can adjust the reactivity of the first fuel 182 by combining the first fuel with another processing fluid used by the internal combustion system 100. For example, the convertor 190 can combine the first fuel 182 with a lubricant such as oil taken from the oil reservoir 152 of the lubrication system 150. Oil has a different reactivity than fuel such as diesel, such that combining oil with the first fuel 182 will produce the second fuel 192 having an altered reactivity. For example, lubricating oil may have a cetane number of between about 70-90 so that when combined with the first fuel, the lubrication oil will raise the reactivity of the resulting second fuel. To obtain the oil, the convertor 190 is in fluid communication with the oil line 154 disposed through the internal combustion system 100 possibly downstream of the oil pump 156 and the oil filter 158. To combine the oil with the first fuel 182, the convertor 190 can include a mixing valve 196 such as a T-valve that blends the fuel and oil together. Typically, the amount of oil combined with the first fuel 182 to produce the second fuel 192 will be small enough that the oil reservoir 152 will not be depleted before additional oil can be added during scheduled maintenance or, for example, at the time of replenishing the first fuel in the first fuel reservoir 180.

In accordance with another embodiment of the disclosure, the convertor 190 can include a catalyst 198 that can chemically react with the first fuel passing therein to alter the reactivity, for example, by changing its cetane number. The catalyst 198 can include internal baffles or honeycomb plates that provide surface area that the first fuel can contact when directed through the convertor. The material of the internal baffles or honeycomb plates chemically reacts with the first fuel to produce the second fuel. Possible materials for the catalyst can include metals such as platinum, palladium, rhodium, iridium, osmium, ruthenium and the like, and oxides, mixtures and alloys of the foregoing. The catalyst may work particularly well when the first fuel 182 is gasoline. In other embodiments, the convertor 190 can include a permeable, flexible membrane 199 supported in the convertor and through which the first fuel 182 is directed and which can segregate the first fuel into constituents of different reactivities to produce the second fuel 192. Acceptable materials for the membrane 199 include polymers such as polyamide, polyimide, fluoropolymers and the like, that may be treated or conditioned to enhance the separation of the fuel constituents. In other embodiments, the convertor can include a fuel reformer such as those commonly known in the art like a plasma reactor that produces a reformate fuel of a different reactivity.

In various embodiments, the convertor 190 can be adjustable so that the reactivity of the second fuel 192 can be selectively determined and adjusted during the course of operation of the internal combustion system 100. In the two-fuel system such as the one disclosed in Reitz, the relative difference in reactivity between the first and second fuels may be as significant as the actual reactivity of either the first or second fuels. As engine temperature, engine speed and environmental conditions change during the course of operation, it may be beneficial to alter the relative reactivity between the first and second fuels to improve the two-fuel process. Further, the reactivity of the first fuel that is used to produce the second fuel may vary depending upon where and from whom it is obtained. As can be appreciated, reactivity may vary between brands and suppliers of diesel and other fuels. Enabling the convertor 190 to be adjusted during operation can accommodate for the difference in reactivities among different fuel brands. Adjusting the convertor 190 can be accomplished in various ways including controlling the quantity or flow of the first fuel 182 directed to the convertor, adjusting the quantity of the surface area of the catalyst or membrane that the first fuel has access to, adjusting the manner by which the first fuel is introduced to the convertor such as by spraying, laminar fluid flow or turbulent fluid flow, etc.

Referring back to FIG. 1, to controllably adjust the convertor 190 and more broadly to control operation and performance of the internal combustion system 100, the system can include an electronic or computerized control unit, module or controller 200. The controller is adapted to monitor various operation parameters and to responsively regulate various variables affecting engine operation. The controller 200 can include a microprocessor or other appropriate circuitry and can have memory or other data storage capabilities. Although in FIG. 1 the controller 200 is illustrated as a single, discrete unit, in other embodiments, the controller and its functions may be distributed among a plurality of distinct and separate components. To receive operating parameters and send control commands, the controller can be operatively associated with and can communicate with various sensors and controls on the internal combustion system components. Communication between the controller and the sensors can be established by sending and receiving digital or analog signals across electronic communication lines or communication busses. The various communication and command channels are indicated in dashed lines for illustration purposes.

For example, to monitor the pressure and/or temperature in the intake manifold 120, the controller 200 can communicate with an intake manifold sensor 202 such as a transducer or other electronic device that is disposed in the intake manifold and that can sense or measure the conditions therein. To monitor the conditions such as pressure and/or temperature in the exhaust manifold 130, the controller 200 can similarly communicate with an exhaust manifold sensor 204 disposed in the exhaust manifold 130. From the temperature of the exhaust gasses in the exhaust manifold 130, the controller 200 may be able to infer the temperature at which combustion in the combustion chambers 108 is occurring. To more specifically monitor conditions in the combustion chambers, the controller 200 may communicate with cylinder sensors 210, one of which may be associated with each cylinder 110 in the engine block 104. The cylinder sensors 210 can monitor the combustion chamber conditions directly or indirectly. For example, by measuring the backpressure exerted against the intake or exhaust valves during combustion, the cylinder sensors 210 and the controller 200 can indirectly measure the pressure in the cylinder 110. To determine the speed or stage of the combustion cycle, the controller 200 can also communicate with a crankshaft sensor 212 disposed proximate the crankshaft or the drive shaft 118 and that indirectly infer the speed and position of the translating pistons 106 moving in the cylinders 110.

To further control the combustion process, the controller 200 can communicate with injector controls 220 that may be operatively associated with each of the fuel injectors 148/149. The injector controls 220 can determine the timing of introduction and the quantity of fuel introduced into each combustion chamber 108. To further control the timing of the combustion operation, the controller 200 can also communicate with a camshaft control 222 operatively associated with the camshaft 140. By managing the speed and rotation of the camshaft 140, the controller 200 can control which valves are open and for how long, thereby controlling the quantity of air into and exhaust gasses out of the combustion chambers 108. The controller 200 can also be communicatively linked to a throttle control 224 on the throttle 166 to manage the quantity of fresh air introduced into the internal combustion system 100.

To determine and manage the reactivities of the first fuel 182 and the second fuel 192 that will be used in the combustion process, the controller 200 can be communicatively linked with a first reservoir sensor 230 and with a convertor control 232. Utilizing the first reservoir sensor 230, the controller can determine the initial reactivity of the first fuel 182 as represented by its cetane number or otherwise. Alternatively, the cetane rating of the first fuel 182 can be determined empirically based on engine operating parameters. Using information about the combustion process from the other sensors and controls, the controller 200 can also determine what the relative reactivity between the first fuel 182 and the second fuel 192 should be to conduct the two-fuel combustion process. The actual value for the reactivity of the second fuel can be extrapolated from this information and, once determined, the controller 200 can use that value to control the operation of the convertor 190. For example, in the embodiments in which the convertor 190 is adjustable, the controller 200 can alter the quantity or rate at which the first fuel 182 is converted to the second fuel 192 or it can adjust the final reactivity or cetane number of the second fuel.

Referring to FIGS. 2-5, there is illustrated an exemplary series of fuel introduction or injection events of the first and second fuels having different reactivities to provide stratified fuel/air mixture regions within the combustion chamber 108 that may generally be in accordance with the disclosure in Reitz. Starting with FIG. 2, an initial charge of the first fuel having a first, low reactivity, is introduced into the variable volume 116 while the piston 106 is moving to the BDC position during an intake stroke or shortly after the piston has reached the BDC position at the completion of the intake stroke. The first fuel can be obtained from the unaltered first fuel reservoir associated with the internal combustion system. To introduce the first fuel into the combustion chamber 108, the first fuel injector 148 can be activated dispersing a first fuel plume 300 into the variable volume 116. The introduction of the first fuel plume 300 can occur at any suitable instance during the intake stroke. In an alternative embodiment, the first fuel may be mixed with intake air as the intake air enters the cylinder through the intake port.

Figure 3:
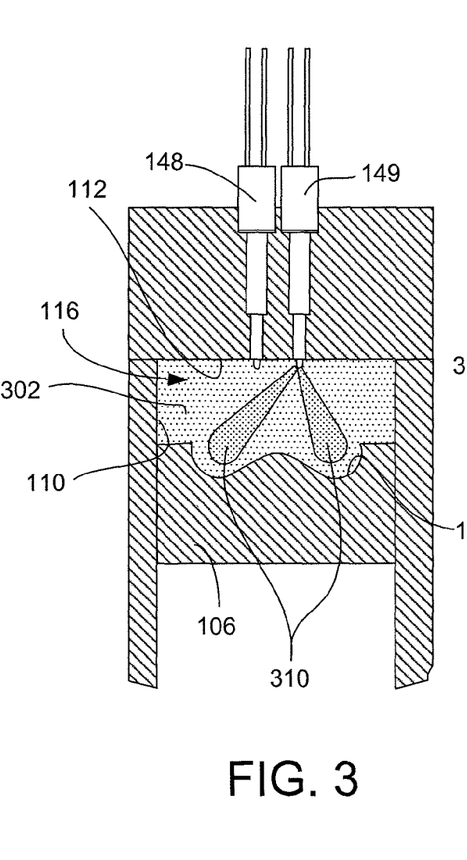
FIGS. 3-5 are cross-sectional views of the engine cylinder and the piston movably disposed therein at various points during a compression cycle during which stratified regions of different reactivities are formed within the cylinder.

Referring to FIG. 3, the first fuel plume 300 should intermix or form a relatively uniform or homogenous mixture 302 with the intake air throughout the variable volume 116 as the piston 106 begins to move from the BDC position toward the TDC position during a compression stroke. This motion of the piston 106 also compresses the mixture 302 thereby raising the pressure inside the cylinder 110. At this stage, the second fuel having the relatively higher reactivity can be introduced to the variable volume 116. This can be accomplished by injecting a second fuel plume 310 into the cylinder 110 by use of the second fuel injector 149. The second fuel plume 310 can include the second fuel that has been adjusted by the convertor associated with the internal combustion system. The second fuel plume 310 can be injected into the variable volume anywhere between the BDC position of the piston 106 (180 degrees of crankshaft rotation before TDC) and 10 degrees before the TDC position (0 degree position). During this time, the upward moving piston 106 continues to compress the mixture 302 of the first fuel and the intake air.

Figure 4:
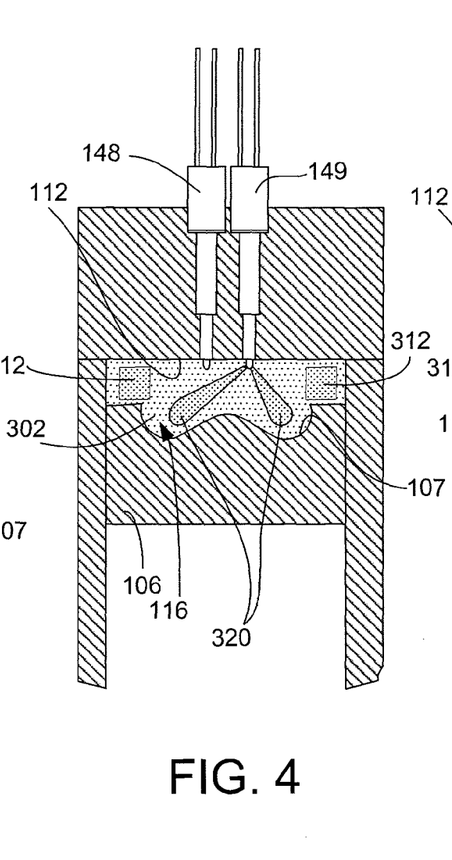

Referring to FIG. 4, if the introduction of the second fuel plume occurs sufficiently early during the compression stroke, the second fuel may form first regions 312 of higher reactivity within the mixture 302 and that may migrate or progress toward the outer periphery of the variable volume 116. If the piston 106 has a bowl 107 with an associated upward directed, outermost rim, the first regions 312 may become compressed or "squished" between the piston and the flame deck surface 112 at the outer periphery of the variable volume 116. At this stage, another introduction of higher reactivity fuel can be accomplished by injecting a third plume 320 into the variable volume 116. The third plume 320 can include the higher reactivity second fuel from the convertor or, in other embodiments, it can be obtained from a different source having a different reactivity than either the first and second fuels. The third plume 320 might be relatively more centralized with in the variable volume 116 and might be generally directed toward the bowl 107 of the cylinder 110.

Figure 5:
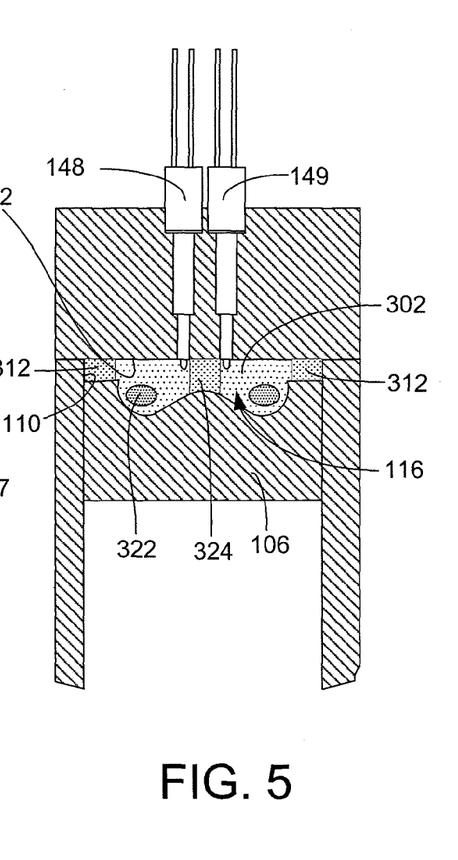

At the time the piston 106 reaches the TDC position, shown in FIG. 5, the higher reactivity fuel introduced by the third plumes may have formed second regions 322 of higher reactivity that are located intermediately between the outer periphery and the center of the variable volume 116 and that may be proximately located within the bowl 107 of the piston 106. Additionally, there may be a third region 324 of higher reactivity fuel formed generally at the center of the variable volume 116 resulting from the diffuse fuel remaining proximate to the second fuel injector 149 after the third injection event. The first regions 312 may remain located at the outer periphery squished between the piston 106 and the flame deck surface 112 but, overtime, may have diffused so that they have an intermediate reactivity compared to the mixture 302 and the second and third regions 322, 324.

Thus, at TDC just before combustion, the variable volume includes a plurality of regions of different reactivities that are stratified relative to each other. These regions include: (1) the mixture 302 of relatively low reactivity generally dispersed throughout the variable volume 116; (2) the first regions 312 of intermediate reactivity at the outer periphery; and (3) the second and third regions 322, 324 of higher reactivity that are generally centrally located. At the time the piston 106 reaches TDC, compression of the variable volume 116 and the associated pressure and temperature rise may reach a point where the contents of the variable volume auto-ignite. Combustion may begin in the second and third regions 322, 324 of higher reactivity and propagate to the first regions 312 of intermediate reactivity then through the mixture 302 dispersed through the variable volume 116.

To facilitate appropriate stratification of the different regions in the combustion chamber by providing first and second fuels of appropriate relative reactivity, the controller can monitor various operating parameters and adjust the reactivity of the second fuel as indicated above. For example, referring to FIG. 6, which illustrates an example of such a process 400, in an initial storage step 402 fuel of a first reactivity is stored in the first fuel reservoir. In a first introduction step 404, some of the first fuel is introduced into the combustion chamber at a first time or instance such as during an intake stroke. To produce the second fuel having a different reactivity, the convertor converts some of the first fuel in a conversion step 410, and some of the second fuel can be introduced in a second introduction step 412 to the combustion chamber at a second, later time such as during the compression stroke. One or more subsequent introduction steps can also occur to produce the stratified matrix or regions of different reactivity.

Figure 6:
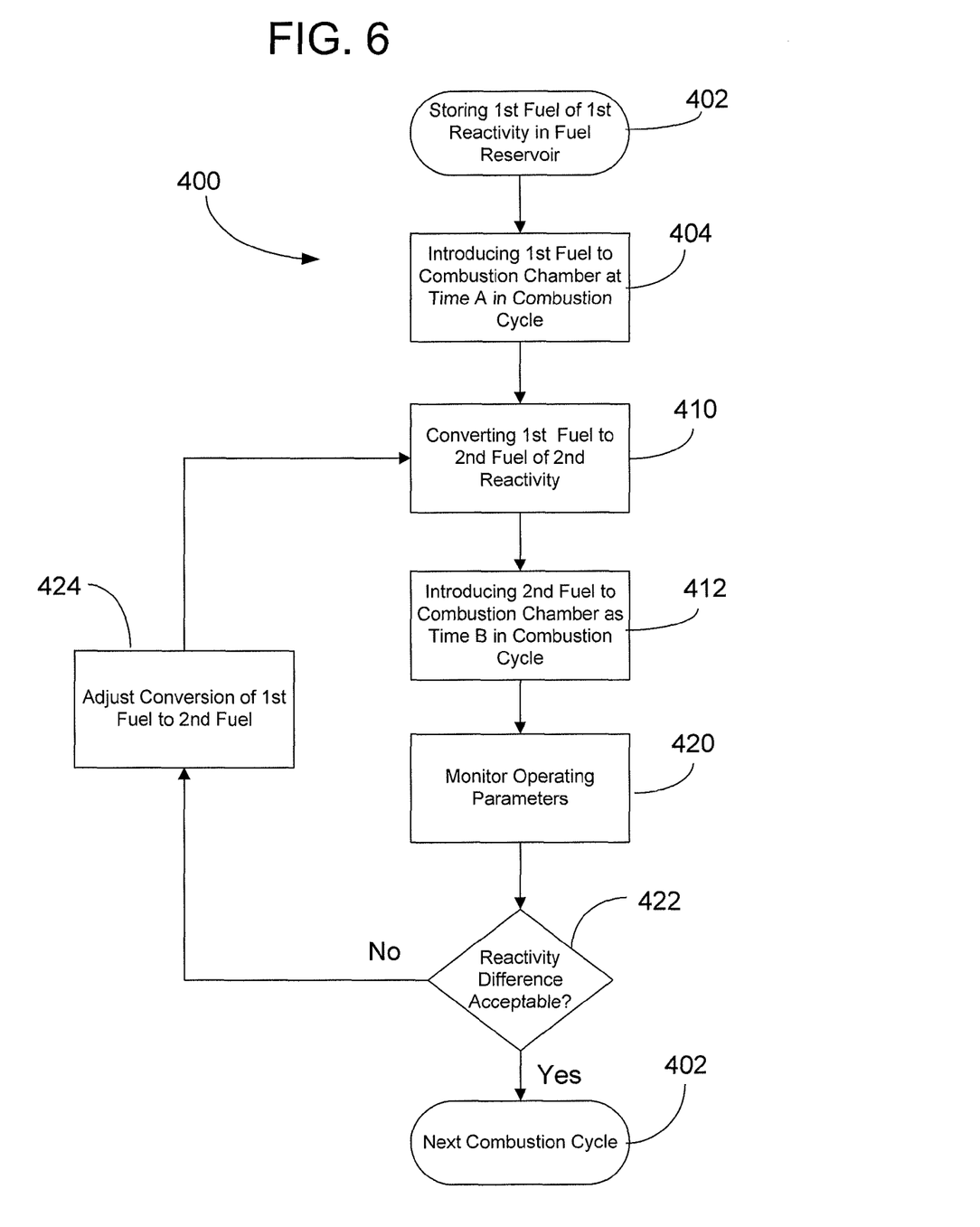
FIG. 6 is a schematic flow chart representing various possible routines or steps that may be performed to enable a corrective feedback system in the internal combustion system disclaimed in FIG. 1.

If, however, the stratified regions are not forming appropriately, the controller can attempt to correct this. To determine if a problem exists, the controller in a monitoring step 420 can monitor one or more operating parameters from which the controller can infer or assess the quality of the combustion process. For example, the operating parameters can include cylinder pressure or temperature, fuel efficiency, exhaust gas composition such as emissions and byproducts, etc. From the monitored operating parameters, the controller can determine in a determining step 422 whether the relative reactivity levels of the first and second fuels are correct or whether they should be adjusted. If adjustment is required, the controller in an adjustment step 424 can generate a corrective instruction or command and communicate it as a signal back to the convertor. Hence, in an embodiment, the internal combustion system includes real-time, corrective feedback of the combustion process.

Industrial Applicability

Referring back to FIG. 1, the present disclosure is applicable to producing first and second fuels 182, 192 of different reactivities for use in the internal combustion system 100 adapted for the combustion process described herein. A possible advantage of the disclosure is that it utilizes a single fuel source and converts that fuel to provide the second fuel of a different reactivity. Thus, supply of only a single type of fuel is required. For example, a first fuel 182, such as commercially available diesel, can be stored in the first fuel reservoir 180. Some of the first fuel 182 can be directed by the first fuel line 184 to the fuel injectors for introduction into the variable volume 116 during the intake stroke of the piston 106 within combustion chamber 108. The first fuel can homogenously disperse in the variable volume 116 to produce the conditions represented generally in FIG. 2.

To produce the second fuel 192 of a second, different reactivity, a portion of the first fuel is directed onto the convertor 190. The convertor 190 can adjust the reactivity of the first fuel by, for example, combining it with a processing fluid such as lubricating oil, catalytic conversion, membrane separation or the like. The second fuel 192 is directed from the convertor 190 to the fuel injectors 148/149 for introduction to the variable volume 116 during the compression stroke. The second fuel forms first regions 312 and second regions 322, 324 of higher reactivity stratified or localized within the variable volume 116 resulting in the conditions represented generally in FIGS. 4 and 5. Upon auto-ignition, the stratified regions may provide for a more thorough and complete combustion of the first and second fuels, resulting in improved thermal efficiency as a measure of the conversion efficiency of fuel to utilized power as opposed to heat or entropy losses. Stratification of the regions of higher and lower reactivity can also be responsible for and, in some cases, can be manipulated to control, at least in part, the duration and temperature of combustion to reduce the creation of nitrogen oxides and other emissions.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method of operating an internal combustion engine configured to utilize fuels having two different reactivities from a single fuel source, the method comprising:

storing a first fuel in a first fuel reservoir, the first fuel having a first reactivity;

converting a portion of the first fuel to a second fuel having a second reactivity;

introducing the first fuel to a variable volume defined by a piston moving in a cylinder at a first time when the piston is relatively closer to a bottom dead center (BDC) position;

introducing the second fuel having a second reactivity into the variable volume at a second time when the piston is relatively further from the BDC position;

sensing by a sensor operatively associated with internal combustion engine one or more operating parameters, communicating the one or more operating parameters to a controller operatively associated with the internal combustion engine adjusting by the controller the step of converting based on the one or more operating parameters reflective of operation of the internal combustion engine.

2. The method of claim 1, wherein an adjustable convertor performs the step of converting.

3. The method of claim 2, wherein the adjustable convertor is selected from the group consisting of a mixing valve, a catalyst, a fuel reformer, and a separation membrane.

4. The method of claim 3, wherein the adjustable convertor is controlled by a controller in communication with the adjustable convertor.

5. The method of claim 4, wherein the controller adjusts the adjustable convertor based on the one or more operating parameters, the one or more operating parameters selected from the group consisting of cylinder pressure, cylinder temperature, fuel efficiency, and exhaust gas composition.

6. The method of claim 1, wherein the second reactivity of the second fuel is higher than the first reactivity of the first fuel.

7. An internal combustion system comprising:
an internal combustion engine;
a first fuel reservoir storing a first fuel of a first reactivity;
a first fuel line directing the first fuel from the first fuel reservoir to the internal combustion engine;
a second fuel line directing the first fuel to an adjustable convertor for converting the first fuel to a second fuel having a second reactivity different than the first reactivity, the second fuel line further directing the second fuel to the internal combustion engine,
at least one sensor disposed in the system monitoring at least one operating parameter of the system; and
a controller communicating with the at least one sensor wherein the controller adjusts the adjustable convertor based on the at least one operating parameter.

8. The system of claim 7, further comprising a first injector for introducing the first fuel into a variable volume defined by a piston moving in a cylinder; and a second injector for introducing the second fuel into the variable volume.

9. The system of claim 8, further comprising a controller communicating with the first injector and the second injector, the controller configured to activate the first injector to introduce the first fuel during an intake-compression cycle; and to activate the second injector to introduce the second fuel later in the intake-compression cycle.

10. The system of claim 9, wherein the internal combustion engine includes the piston moving in the cylinder in the intake-compression cycle from a top dead center (TDC) to a bottom dead center (BDC) position and back to the TDC position.

11. The system of claim 10, wherein the controller communicates with at least one sensor disposed in the system monitoring at least one operating parameter of the system, and wherein the controller adjusts the adjustable convertor based on the at least one operating parameter to adjust the second reactivity of the second fuel.

12. The system of claim 7, wherein the adjustable convertor is selected from the group consisting of a mixing valve, a catalyst, a fuel reformer, and a separation membrane.

13. The system of claim 12, wherein the adjustable convertor is the mixing valve in fluid communication with processing fluid reservoir storing a processing fluid used by the internal combustion system.

14. A method of operating an internal combustion engine comprising:
storing a first fuel in a first fuel reservoir, the first fuel having a first reactivity;
combining a portion of the first fuel from the first fuel reservoir with an engine lubricant used by the internal combustion engine to produce a second fuel having a second reactivity;
introducing the first fuel into a variable volume defined by a piston moving in a cylinder at a first time when the piston is relatively closer to a bottom dead center (BDC) position; and
introducing the second fuel into the variable volume at a second time when the piston is relatively further from the BDC position.

15. The method of claim 14, wherein the processing fluid is oil from an oil reservoir associated with the internal combustion engine.

16. The method of claim 14, wherein the step of combining is performed by an adjustable mixing valve.

17. The method of claim 16, wherein the step of combining is controlled by a controller communicating with the adjustable mixing valve.

18. The method of claim 17, wherein the controller adjusts the adjustable mixing valve based on one or more operating parameters reflective of operation of the internal combustion engine.

19. The method of claim 18, wherein the one or more operating parameters are selected from the group consisting of cylinder pressure, cylinder temperature, fuel efficiency, and exhaust gas composition.

* * * * *